United States Patent
Collin et al.

(10) Patent No.: US 6,187,254 B1
(45) Date of Patent: Feb. 13, 2001

(54) METHOD OF SINTERING SILICON NITRIDE BASED MATERIALS

(75) Inventors: Marianne Collin, Skarpnäck; Marian Mikus, Skärholmen, both of (SE)

(73) Assignee: Sandvik AB, Sandviken (SE)

( * ) Notice: Under 35 U.S.C. 154(b), the term of this patent shall be extended for 0 days.

(21) Appl. No.: 09/155,542

(22) PCT Filed: Mar. 25, 1997

(86) PCT No.: PCT/SE97/00524

§ 371 Date: Jan. 15, 1999

§ 102(e) Date: Jan. 15, 1999

(87) PCT Pub. No.: WO97/35817

PCT Pub. Date: Oct. 2, 1997

(30) Foreign Application Priority Data

Mar. 25, 1996 (SE) .................................... 9601159

(51) Int. Cl.[7] .................................... C04B 33/34
(52) U.S. Cl. .................... 264/640; 264/641; 264/643; 264/663; 264/664; 264/665; 264/668; 427/249; 427/255
(58) Field of Search .................... 264/640, 641, 264/643, 663, 664, 665, 668; 427/249, 255

(56) References Cited

U.S. PATENT DOCUMENTS

| | | | | |
|---|---|---|---|---|
| 4,379,110 | * | 4/1983 | Greskovich et al. | 264/325 |
| 4,632,910 | * | 12/1986 | Lee et al. | 501/97 |
| 4,994,219 | * | 2/1991 | Yeh | 501/97 |
| 5,122,486 | * | 6/1992 | Kito et al. | 501/97 |
| 5,173,458 | * | 12/1992 | Nishioka et al. | 501/97 |

FOREIGN PATENT DOCUMENTS 4311155  10/1994 (DE) .

* cited by examiner

Primary Examiner—Christopher A. Fiorilla
(74) Attorney, Agent, or Firm—Burns, Doane, Swecker & Mathis, L.L.P.

(57) ABSTRACT

The present invention relates to a method for sintering of a silicon nitride based material using gas pressure sintering technique. It has been found that using a sintering atmosphere containing nitrogen and 0.1–10 vol-% carbon monoxide a cutting tool material is obtained with improved properties, particularly increased edge toughness, when machining heat resistant alloys.

21 Claims, 1 Drawing Sheet

METHOD OF SINTERING SILICON NITRIDE BASED MATERIALS

This application is a 371 of PCT/SE97/00524 filed Mar. 25, 1997.

BACKGROUND OF THE INVENTION

The present invention relates to sintering methods for silicon nitride and sialon material compositions and in particular sialon materials useful for machining of heat resistant alloys.

Silicon nitride is a highly covalent compound with a number of interesting engineering properties. An adverse effect of the strong bonding is a low self diffusivity why the material cannot be consolidated by solid state sintering. Sintering additives such as $Al_2O_3$, $Y_2O_3$ and MgO are used to form a liquid with the $SiO_2$ which is always present on the surface of the $Si_3N_4$ grains. The resulting material has a two-phase microstructure consisting of silicon nitride grains embedded in an intergranular bonding phase, which is normally a glass.

Beta-prime SiAlOM ($Si_{6-z}Al_zO_zN_{8-z}$) is a solid solution where $0<z<4.2$. SiAlOM materials normally also contain an intergranular bonding phase which can be a glass or contain various crystalline phases. SiAlOM ceramic cutting tools may also contain alpha SiAlOM (($Si,Al)_{12}M_x(O,N)_{16}$ where x is between 0.1 and 2 and M can be Li, Ca, Mg, Hf, Zr, Ce, Y, Sc or other lanthanides) and intergranular phases.

Silicon nitride and SiAlON decompose at high temperatures which is why sintering normally is performed in nitrogen atmosphere.

Pressureless (atmospheric pressure) sintering, besides nitrogen atmosphere, normally requires embedding of the object to be sintered in a suitable powder bed to avoid decomposition.

Hot isostatic pressing requires encapsulation of the object to be sintered prior to sintering.

Gas pressure sintering (GPS) is a method of sintering powder metallurgical parts to almost 100% relative density without any of the precautions necessary for the above mentioned sintering methods. According to this method the first part of the sintering is performed at conventional pressure. When closed porosity is reached the gas pressure is substantially increased and maintained during cooling.

Another advantage of increased pressure during sintering, if nitrogen is used as pressure medium, is a reduction or elimination of the thermal decomposition of the ceramic material.

OBJECTS AND SUMMARY OF THE INVENTION

It is an object of this invention to avoid or alleviate the problems of the prior art.

It is further an object of this invention to provide sintering methods for silicon nitride and SiAlOM material compositions and in particular SiAlOM materials useful for machining of heat resistant alloys.

It is an aspect of the invention to provide a method for sintering a silicon nitride based material using gas pressure sintering, comprising sintering a silicon nitride based material in a low pressure sintering step followed by a high pressure sintering step wherein the sintering atmosphere contains nitrogen and an oxygen-containing gas in an amount equal to the oxygen potential of 0.1–10 volume % of carbon monoxide.

DETAILED DESCRIPTION OF THE PREFERRED EMBODIMENTS OF THE INVENTION

Figure 1:
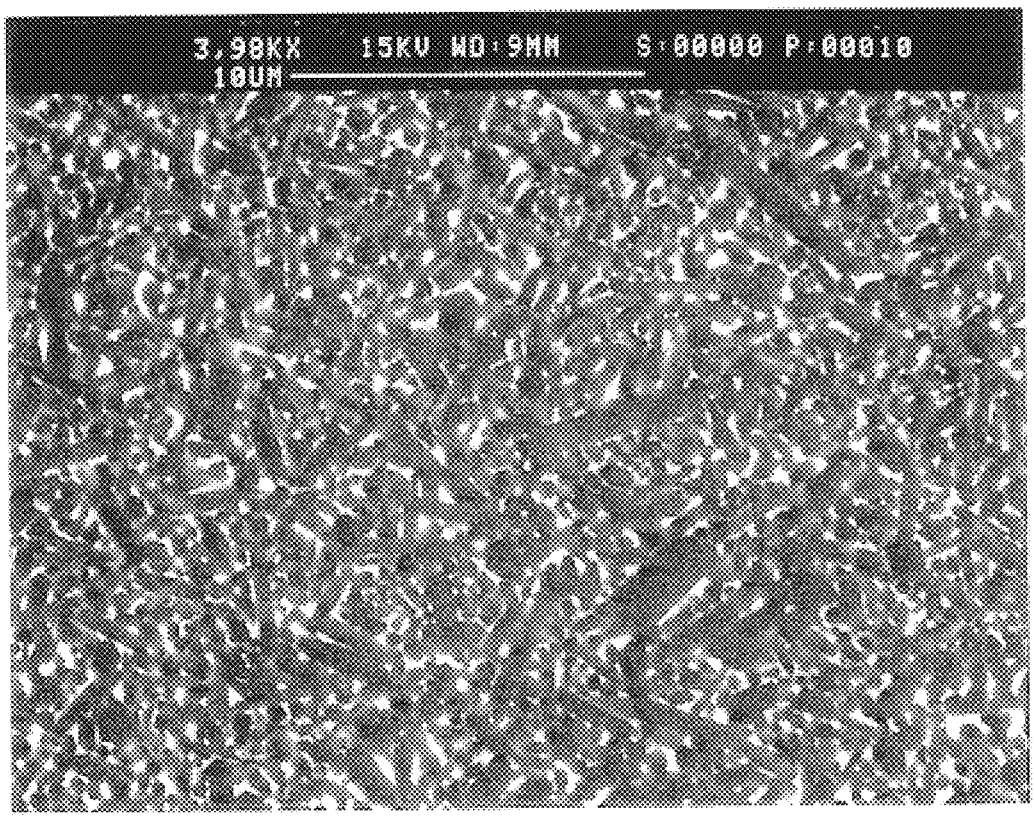
FIG. 1 shows in 4000× magnification of a SiAlOM material produced according to the present invention.

According to the present invention it has now surprisingly been found that; by careful sintering of a silicon nitride based material containing essentially beta SiAlOM in a nitrogen atmosphere in a gas pressure sintering furnace in a sintering cycle comprising addition of carbon monoxide a cutting tool material is obtained with improved properties when cutting heat resistant alloys. The reason to the improvement is not fully understood at present. Since the reduction in porosity is only marginal it is believed that an intergranular phase with favourable properties is obtained and that this fact has a positive influence on the cutting properties particularly edge toughness.

The silicon nitride based material according to the present invention is manufactured by powder metallurgical methods, i.e. milling a powder mixture comprising $Si_3N_4$, AlN, $Al_2O_3$ and $Y_2O_3$, of which the latter may be replaced partly or completely by other suitable oxides such as oxides from the lanthanide series, in desired proportions followed by pressing and sintering. The mixture is milled for 4–48 hours, preferably 6–20 hours, in a suitable milling liquid e.g. propanolic alcohol together with pressing aids, dried and tool pressed to insert blanks of desired geometry. Alternatively, water is used as milling liquid and in this case AlN is replaced with water-resistant AlN or polytype e.g. 21R. The pressing aids are evaporated in a presintering step at 400–1000° C., preferably 500–700° C. The insert blanks are then processed in a gas pressure sintering furnace using a sintering cycle using a sintering atmosphere containing nitrogen 0.1–10 vol-%, preferably 0.1–1 vol % carbon monoxide. Preferably, carbon monoxide is introduced at a temperature >1500° C. or alternatively during the high pressure part of the sintering process. This makes it possible to increase the oxygen chemical potential during the steps of the sintering cycle where this is favourable. More particularly the sintering process comprises the following steps:

the first step is heating up to about 1350° C. at subpressure, preferably <0.1 bar, the second step is heating to about 1680° C. at 1 bar of nitrogen, the third step is increasing the gas pressure to 5–50, preferably 5–25, most preferably 8–20, bar of nitrogen and adding carbon monoxide or, alternatively, using a premixed $CO/N_2$ gas mixture, the fourth step is increasing the temperature to the final sintering temperature of 1700–1800° C., preferably 1730–1770° C., and maintaining this gas pressure and temperature for 0.5–5 hours, preferably 1–3 hours, the fifth step is cooling to 1100° C. at maintained gas pressure, the sixth step is cooling to room temperature in flowing nitrogen.

The amount of carbon monoxide has to be determined considering the furnace size, total weight and type of silicon nitride based material.

During the fifth step the cooling rate may be increased by further increasing the nitrogen gas pressure.

During the sintering the insert blanks are placed on sintering discs and no powder bed is used. After the sintering the insert blanks are ground into inserts of final shape and dimension.

The method of the present invention can be applied to all kinds of silicon nitride based materials and is not limited to the examples given below. In particular, it applies to SiAlOM material for which particularly good results have been obtained for a material comprising 10–20 vol % intergranular phase and rest crystalline SiAlOM grains of which >70 vol-%, preferably >90 vol-%, is beta-SiAlOM with a z-value of 0.5–3.0, preferably 1.0–2.0 and most preferably 1.0–1.5 and up to 10 vol-%, preferably up to 4 vol-%, polytype such as 2H, 8H, 12H, 15R, 21R, 27R, preferably 12H and optionally alpha SiAlOM. The intergranular phase is essentially amorphous, i.e., it contains no crystalline phase. The material may further contain small intergranular pores <0.5 μm in size. The material has a microstructure characterized in (see FIG. 1) elongated beta-SiAlOM grains with a length up 10 μm and with an aspect ratio >5 and smaller SiAlOM grains with a diameter <2 μm, preferably <1 μm, with one or more intergranular phases situated in between the SiAlOM grains.

The method of the invention also applies to a silicon nitride based material containing one or more refractory phases in particular carbides, oxides or nitrides or solid solutions thereof of V, Nb, Ta, Ti, Zr and Hf. The above mentioned refractory phases may also be in form of whiskers with a small diameter, below 2 μm, preferably below 1 μm. The amount of refractory phases shall exceed 1 vol-% but not exceed 35 vol-%, preferably greater than 5 vol-% but less than 25 vol-%.

Further improvements of the wear resistance of the SiAlON material according to the invention may be obtained by coating with one or more refractory layers such as $Al_2O_3$, TiC, TiN or Ti(C,N), Ti(C,O), Ti(N,O), Ti(C,N,O), etc., using methods known in the art such as CVD, MTCVD, PVD etc. The total thickness of the coating is less than 15 μm, preferably less than 5 μm.

The invention is described with the use of added carbon monoxide. Of course, alternatively other oxygen containing gases e.g. $CO_2$, $O_2$, NO, $NO_2$ can be used alone or in combination with each other and carbon monoxide in such an amount that the corresponding oxygen potential is obtained.

The invention is additionally illustrated in connection with the following Examples which are to be considered as illustrative of the present invention. It should be understood, however, that the invention is not limited to the specific details of the Examples.

EXAMPLES 1

A ceramic slurry was manufactured in a conventional way by wet dispersion in propanolic alcohol. The composition of the ceramic raw materials was 5 weight-% of $Y_2O_3$, 8 weight-% of AlN, 24 weight-% of $Al_2O_3$ and balance of $Si_3N_4$. Suitable pressing aids were added. The slurry was dried and sieved through a 0.5 mm sieve and the powder thus obtained was tool pressed to cylindrical insert blanks of the geometry B-RNGN 120800. The insert blanks were then presintered at 600° C. in a hydrogen atmosphere and afterwards divided into two groups and sintered according to two different sintering methods:

Sintering method A (prior art): The insert blanks were sintered in a gas pressure sintering furnace (graphite isolated) in a sintering cycle which first step was heating up to about 1350° C. at subpressure, the second step was heating to about 1680° C. at 1 bar of nitrogen, the third step was increasing the gas pressure to 12 bar of nitrogen, the fourth step was increasing the temperature to the final sintering temperature of 1750° C. and maintaining the gas pressure and temperature for 2 hours, the fifth step was cooling to 1100° C. at maintained gas pressure, the sixth step was cooling to room temperature in flowing nitrogen. During the sintering the inserts were placed on open sintering discs.

Sintering method B (according to the invention): The insert blanks were sintered in a gas pressure sintering furnace in a sintering cycle which first step was heating up to about 1350° C. at subpressure, the second step was heating to about 1680° C. at 1 bar of nitrogen, the third step was increasing the gas pressure to 12 bar of nitrogen and adding of CO in an amount corresponding to a pressure increase of 0.7 bar, the fourth step was increasing the temperature to the final sintering temperature of 1750° C. and maintaining the gas pressure and temperature for 2 hours, the fifth step was cooling to 1100° C. at maintained gas pressure, the sixth step was cooling to room temperature in flowing nitrogen. During the sintering the inserts were placed on open sintering discs.

The sintered insert blanks were investigated by measuring sintered density and z-value with the following results:

| Sintering method | Sintered density, g/cm$^3$ | z-value |
| --- | --- | --- |
| A (prior art) | 3.165 | 1.97 |
| B (according to the invention) | 3.170 | 1.97 |

The sintered densities received correspond to a relative density of >99%.

EXAMPLE 2

Insert blanks sintered according to sintering methods A, and B in example 1 were ground to the style RNGN 120700 T01020 and tested in a turning operation developed to evaluate edge toughness. The cutting parameters were as follows:

| | |
| --- | --- |
| Workpiece: | Inconel 718Å |
| Cutting speed: | 250 m/min |
| Cutting depth: | 0.1–6 mm |
| Feed: | 0.15 mm/rev |
| Result (mean of four tests): | number of cuts |
| Variant A (prior art): | 9.1 |
| Variant B (according to the invention): | 10.5 |

EXAMPLE 3

A ceramic slurry was manufactured in a conventional way by wet dispersion in propanolic alcohol. The composition of the ceramic raw materials was 5 weight-% of $Y_2O_3$, 10 weight-% of AlN, 18.3 weight-% of $Al_2O_3$ and balance of $Si_3N_4$. Suitable pressing aids were added. The slurry was dried and sieved through a 0.5 mm sieve and the powder thus obtained was tool pressed to cylindrical insert blanks of the geometry B-RNGN 120800. The insert blanks were then presintered at 600° C. in a hydrogen atmosphere and afterwards sintered according to the invention in a gas pressure sintering furnace (graphite isolated). The first step of the sintering cycle was heating up to about 1350° C. at subpressure, the second step was heating to about 1680° C. at 1 bar of nitrogen, the third step was increasing the gas pressure to 12 bar of nitrogen and adding of CO in an amount corresponding to a pressure increase of 0.5 bar, the fourth step was increasing the temperature to the final sintering temperature of 1750° C. and maintaining the gas pressure and temperature for 2 hours, the fifth step was cooling to 1100° C. at maintained gas pressure, the sixth step was cooling to room temperature in flowing nitrogen. During the sintering the inserts were placed on open sintering discs.

The sintered insert blanks were investigated by measuring sintered density which was 3.213 g/cm$^3$ and the z-value was z=1.41.

EXAMPLE 4

A ceramic slurry was manufactured in a conventional way by wet dispersion in water. The composition of the ceramic raw materials was 4.9 weight-% of $Y_2O_3$, 12.8 weight-% of polyphase 21R, 14.5 weight-% of $Al_2O_3$ and balance of $Si_3N_4$. Suitable dispersing and pressing agents were added. The slurry was dried and granulated and the powder thus obtained was tool pressed to cylindrical insert blanks of the geometry B-RNGN 120800. The insert blanks were then presintered at 600° C. in a hydrogen atmosphere and afterwards sintered according to example 3. The sintered insert blanks were investigated by measuring sintered density which was 3.214 g/cm$^3$ and the z-value was z=1.13.

EXAMPLE 5

A ceramic slurry was manufactured by wet dispersion in water. A water-resistant grade of AlN was chosen and added at the end of the milling step in order to avoid too long exposure to water. The composition of the ceramic raw materials was 5 weight-% of $Y_2O_3$, 10 weight-% of AlN, 18.3 weight-% of $Al_2O_3$ and balance of $Si_3N_4$. Suitable dispersing and pressing agents were added. The slurry was dried and granulated and the powder thus obtained was tool pressed to cylindrical insert blanks of the geometry B-RNGN 120800. The insert blanks were then presintered and sintered according to example 3.

The sintered insert blanks were investigated by measuring sintered density which was 3.211 g/cm$^3$ and the z-value was z=1.41.

EXAMPLE 6

Insert blanks sintered according to example 3,4 and 5 were ground to the style RNGN 120700 T01020 and tested in a turning operation developed to evaluate edge toughness. The cutting parameters were as follows:

| | |
|---|---|
| Workpiece: | Inconel 718Å |
| Cutting speed: | 250 m/min |
| Cutting depth: | 0.1–6 mm |
| Feed: | 0.15 mm/rev |
| Result (mean of four tests): | number of cuts |
| Example 3 (A1N) | 10.1 |
| Example 4 (polyphase 21R) | 11.0 |
| Example 5 (water-resistant A1N) | 10.5 |

What is claimed is:

1. A method for sintering a silicon nitride based material using gas pressure sintering, comprising sintering a silicon nitride based material in a low pressure sintering step followed by a high pressure sintering step wherein the sintering atmosphere contains nitrogen in both said sintering steps and an oxygen-containing gas in an amount equal to an oxygen potential corresponding to that of 0.1–10 volume % of carbon monoxide in at least the high pressure sintering step.

2. The method of sintering the silicon nitride based material of claim 1 wherein the oxygen-containing gas is carbon monoxide.

3. The method of sintering the silicon nitride based material of claim 2 wherein the sintering atmosphere is nitrogen and carbon monoxide.

4. The method of sintering the silicon nitride based material of claim 1 wherein the carbon monoxide is introduced at a temperature above 1500° C.

5. The method of sintering the silicon nitride based material of claim 1 wherein the carbon monoxide is introduced during the high pressure step of the sintering process.

6. The method of sintering the silicon nitride based material of claim 1 wherein the sintering comprises the following steps:

heating to about 1350° C. at a subatmospheric pressure;

heating to about 1680° C. at 1 bar of nitrogen;

increasing the gas pressure to 5–50 bar, and introducing carbon monoxide gas;

increasing the temperature to a sintering temperature of 1700°–1800° C.;

maintaining the gas pressure and temperature for from 0.5–5 hours;

cooling to 1100° C. while maintaining the gas pressure; and cooling to room temperature.

7. The method of sintering the silicon nitride based material of claim 1 wherein the silicon nitride based material is a SiAlON.

8. The method of sintering the silicon nitride based material of claim 1 wherein the silicon nitride based material is a SiAlON material comprising 10–20 volume % of an essentially amorphous intergranular phase, greater than 70 volume % beta-SiAlON with a z-value of 0.5–3.0 and up to 10 volume % of a polytype.

9. The method of sintering the silicon nitride based material of claim 8 wherein the beta-Sialon is greater than 90 volume %.

10. The method of sintering the silicon nitride based material of claim 8 wherein the z-value of 1.0–2.0.

11. The method of sintering the silicon nitride based material of claim 10 wherein the z-value is 1.0–1.5.

12. The method of sintering the silicon nitride based material of claim 8 wherein the polytype is up to 4 volume %.

13. The method of sintering the silicon nitride based material of claim 8 wherein the SiAlON material also includes alpha-SiALON.

14. The method of sintering the silicon nitride based material of claim 1 wherein the silicon nitride based material contains one or more refractory phases in the amount of 1–35 volume %.

15. The method of sintering the silicon nitride based material of claim 14 wherein the refractory phases are carbides, oxides, nitrides or solid solutions thereof of V, Nb, Ta, Ti, Zr and Hf.

16. The method of sintering the silicon nitride based material of claim 15 wherein said refractory phases are in the form of particles or whiskers with a diameter below 2 μm.

17. The method of sintering the silicon nitride based material of claim 16 wherein the diameter is below 1 μm.

18. The method of sintering the silicon nitride based material of claim 14 wherein the amount of refractory phases is from 5–25 volume %.

19. The method of sintering the silicon nitride based material of claim 1 wherein after sintering, the silicon nitride based material is coated.

20. The method of sintering the silicon nitride based material of claim 19 wherein the coating is selected from the group consisting of $Al_2O_3$, TiC, TiN, Ti(C,N), Ti(C,O), Ti(N,O), Ti(C,N,O) and mixtures thereof.

21. The method of sintering the silicon nitride based material of claim 20 wherein said coating is applied by chemical vapor deposition.

* * * * *